US011949494B2

(12) United States Patent
Sullivan

(10) Patent No.: US 11,949,494 B2
(45) Date of Patent: *Apr. 2, 2024

(54) DIFFERENTIAL ROUTING FOR NON-GEOSTATIONARY ORBIT (NGSO) SATELLITE SYSTEMS

(71) Applicant: The Boeing Company, Chicago, IL (US)

(72) Inventor: Scott Charles Sullivan, South Pasadena, CA (US)

(73) Assignee: The Boeing Company, Chicago, IL (US)

(*) Notice: Subject to any disclaimer, the term of this patent is extended or adjusted under 35 U.S.C. 154(b) by 165 days.

This patent is subject to a terminal disclaimer.

(21) Appl. No.: 17/570,298

(22) Filed: Jan. 6, 2022

(65) Prior Publication Data

US 2022/0263567 A1 Aug. 18, 2022

Related U.S. Application Data

(60) Provisional application No. 63/149,430, filed on Feb. 15, 2021.

(51) Int. Cl.
*H04B 7/185* (2006.01)
*H04B 7/195* (2006.01)
*H04W 40/12* (2009.01)
*H04W 40/24* (2009.01)
*H04W 40/32* (2009.01)

(52) U.S. Cl.
CPC ......... *H04B 7/18513* (2013.01); *H04B 7/195* (2013.01); *H04W 40/12* (2013.01); *H04W 40/248* (2013.01); *H04W 40/32* (2013.01)

(58) Field of Classification Search
CPC ... H04B 7/18513; H04B 7/195; H04W 40/12; H04W 40/248; H04W 40/32
See application file for complete search history.

(56) References Cited

U.S. PATENT DOCUMENTS 5,430,729 A 7/1995 Rahnema
6,032,041 A 2/2000 Wainfan et al.
(Continued)

FOREIGN PATENT DOCUMENTS

EP 0961420 A1 12/1999

OTHER PUBLICATIONS

Chao Chen; Advanced Routing Protocols for Satellite and Space Networks; Georgia Institute of Technology; May 2005.
(Continued)

*Primary Examiner* — Samina F Choudhry
(74) *Attorney, Agent, or Firm* — Duft & Bornsen, PC

(57) ABSTRACT

A Non-Geostationary Orbit (NGSO) satellite system is described that utilizes backbone route tables at its satellites that define different snapshots of a time-varying backbone topology of the NGSO satellite system. Because each satellite may see a different portion of the backbone topology, the backbone route tables at different satellites may be different from each other. Also, the backbone route tables at the satellites may be active at different times as the backbone topology changes over time. Different routing groups of backbone route tables may be defined in order to represent different routing options for packets arriving at a satellite. The routing options for a routing group may emphasis various network performance and security goals for traffic assigned to the routing group.

20 Claims, 11 Drawing Sheets

(56) References Cited

U.S. PATENT DOCUMENTS

| | | |
|---|---|---|
| 9,763,167 B2 | 9/2017 | Gopal et al. |
| 2012/0263042 A1 | 10/2012 | Natarajan et al. |
| 2018/0316428 A1 | 11/2018 | Barritt |
| 2019/0306778 A1 | 10/2019 | Scott |

OTHER PUBLICATIONS

Zijing Cheng et al; Snapshot Integration Routing for High-Resolution Satellite Sensor Networks Based on Delay-Tolerent Network; 2015 IEEE Internation Conference on Computer and Information Technology.

FIG. 11

WIDEBAND CLASSIFIED PACKET DATA

| TABLE NUMBER 1102 | MATCH CONDITION 1104 | ACTION 1106 | |
|---|---|---|---|
| 0 | USER 124 | WRITE NODE ID OF SATELLITE 105, GOTO TABLE 2 | ⎫ |
| 0 | USER 126 | WRITE NODE ID OF SATELLITE 104, GOTO TABLE 2 | ⎬ 222-1 (REMOTE USERS) |
| 0 | NO MATCH | GOTO TABLE 1 | ⎭ |
| 1 | USER 125 | SEND DATA PACKET OVER PORT 1003 | ⎫ 222-2 (LOCAL USERS) |
| 1 | NO MATCH | DROP | ⎭ |
| 2 | ALL | GOTO TABLE 3 | |
| 3 | NODE ID OF SATELLITE 102 | SEND PACKET OVER PORT 1001 | ⎫ |
| 3 | NODE ID OF SATELLITE 104 | SEND PACKET OVER PORT 1004 | ⎬ 226 (ACTIVE BACKBONE ROUTE TABLE) |
| 3 | NODE ID OF SATELLITE 105 | SEND PACKET OVER PORT 1002 | |
| 3 | NODE ID OF SATELLITE 106 | SEND PACKET OVER PORT 1002 | |
| 3 | NODE ID OF SATELLITE 107 | SEND PACKET OVER PORT 1004 | ⎭ |

DIFFERENTIAL ROUTING FOR NON-GEOSTATIONARY ORBIT (NGSO) SATELLITE SYSTEMS

RELATED APPLICATIONS

This non-provisional patent application claims priority to U.S. Provisional Patent Application No. 63/149,430 filed on Feb. 15, 2021, which is incorporated by reference as if fully provided herein.

FIELD

This disclosure relates to the field of routing in satellite systems. In particular, the present disclosure relates to routing data traffic in NGSO satellite systems.

BACKGROUND

NGSO systems utilize constellations of satellites in Low Earth Orbit (LEO) and/or Medium Earth Orbit (MEO) that sweep across the surface of the Earth as they orbit the Earth. This is in contrast to satellites in Geostationary Earth Orbit (GEO), which are stationary with respect to the surface of the Earth as they orbit the Earth.

Due to their relative motion to the surface of the Earth, NGSO satellite systems incur a larger number of ground antenna handovers than GEO satellite systems. Further, unlike handovers in a GEO satellite system that occur due to mobile terminal mobility (e.g., beam handover), NGSO satellite systems are tasked with supporting multiple types of handovers, including intra-orbit handovers (due to the motion of satellites with respect to each other in the same orbital planes), inter-orbit handovers (due to the motion of satellites with respect to each other in different orbital planes), link handovers (due to link outages, which may be due to node and/or link failures), and beam handovers (due to satellite motion, the rotation of the Earth, and/or mobile terminal mobility).

Current solutions for routing in NGSO satellite systems implement link-state routing using Internet Protocol (IP) routers onboard the satellites. Using this approach, a management system constantly calculates and updates the routing information in real time for the entire satellite network when a handover event occurs. As NGSO satellite systems incur a higher number of handovers due to their non-stationary orbits with respect to the surface of the Earth and also due to their relative motion with respect to each other, this type of solution does not scale well to NGSO satellite systems that utilize a large number of satellites. Further, this type of solution is subject to failure when the management system is no longer able, even temporarily, to perform the real-time calculations that the NGSO satellite system relies upon for routing information updates.

SUMMARY

A NGSO satellite system is described that utilizes backbone route tables at its satellites that define different snapshots of a time-varying backbone topology of the NGSO satellite system. Because each satellite may see a different portion of the backbone topology, the backbone route tables at different satellites may be different from each other. Also, the backbone route tables at the satellites may be active at different times as the backbone topology changes over time. Different routing groups of backbone route tables may be defined in order to represent different routing options for packets arriving at a satellite. The routing options for a routing group may emphasize various network performance and security goals for traffic assigned to the routing group. During operation, a satellite may select different routing groups depending on the users, group of users, and/or the type of traffic received by the satellite, and forward data packets destined for users connected to other satellites based on the active backbone routing tables for the selected routing group. The different routing groups provide a technical benefit of enabling different classes of data transport service in the NGSO satellite system, while the different backbone route tables in the routing groups provide a technical benefit of reducing the computation burden on the NGSO satellite system because the backbone route tables in the routing groups are calculated in advance. An additional technical benefit is achieved if the satellites in the NGSO satellite system temporarily lose contact with ground or in-orbit management assets, because the satellites may then select different backbone route tables at different times during the day in order to adapt to the time-changing topology of the NGSO satellite system.

One embodiment comprises a method operable by a satellite of a NGSO satellite system. The method comprises receiving a plurality of routing groups that each define packet routing options for the satellite that are different, where each of the plurality of routing groups includes a plurality of backbone route tables comprising snapshots of a time-varying backbone topology of the NGSO satellite system that implement one of the packet routing options. The method further comprises receiving a data packet for routing in the NGSO satellite system, identifying a routing group of the plurality of routing groups assigned to the data packet, and identifying an active backbone route table from the plurality of backbone route tables in the routing group. The method further comprises forwarding the data packet to another satellite in the NGSO satellite system utilizing at least one of an intra-orbit link and an inter-orbit link based on the active backbone route table to implement one of the packet routing options for the data packet.

Another embodiment comprises a satellite of a NGSO satellite system. The satellite includes a memory and at least one processor. The memory stores a plurality of routing groups that each define packet routing options for the satellite that are different, where each of the plurality of routing groups include a plurality of backbone route tables comprising snapshots of a time-varying backbone topology of the NGSO satellite system that implement one of the packet routing options. The at least one processor receives a data packet for routing in the NGSO satellite system, and identifies a routing group of the plurality of routing groups assigned to the data packet. The at least one processor identifies an active backbone route table from the plurality of backbone route tables in the routing group, and forwards the data packet to another satellite in the NGSO satellite system over at least one of an intra-orbit link and an inter-orbit link based on the active backbone route table to implement one of the packet routing options for the data packet.

Another embodiment comprises a NGSO satellite system that includes a satellite. The satellite includes a memory and at least one processor. The memory stores a plurality of routing groups that each define different packet routing options for the satellite, where each of the routing groups includes at least one backbone route table that implements one of the different packet routing options using a snapshot of a time-varying backbone topology of the NGSO satellite system routable by the satellite. The at least one processor receives a plurality of data packets for users directly connected to other satellites of the NGSO satellite system, identifies the routing groups assigned to the data packets, and differentially routes the data packets to the other satellites using the at least one backbone route table in different routing groups.

The features, functions, and advantages that have been discussed can be achieved independently in various embodiments or may be combined in yet other embodiments, further details of which can be seen with reference to the following description and drawings.

DESCRIPTION OF THE DRAWINGS

Some embodiments are now described, by way of example only, and with reference to the accompanying drawings. The same reference number represents the same element or the same type of element on all drawings.

FIG. 11 depicts user route tables and backbone route tables for a satellite of the NGSO satellite system of FIG. 1 in an illustrative embodiment.

DETAILED DESCRIPTION

The figures and the following description illustrate specific exemplary embodiments. It will be appreciated that those skilled in the art will be able to devise various arrangements that, although not explicitly described or shown herein, embody the principles described herein and are included within the contemplated scope of the claims that follow this description. Furthermore, any examples described herein are intended to aid in understanding the principles of the disclosure are to be construed as being without limitation. As a result, this disclosure is not limited to the specific embodiments or examples described below, but by the claims and their equivalents.

Figure 1:
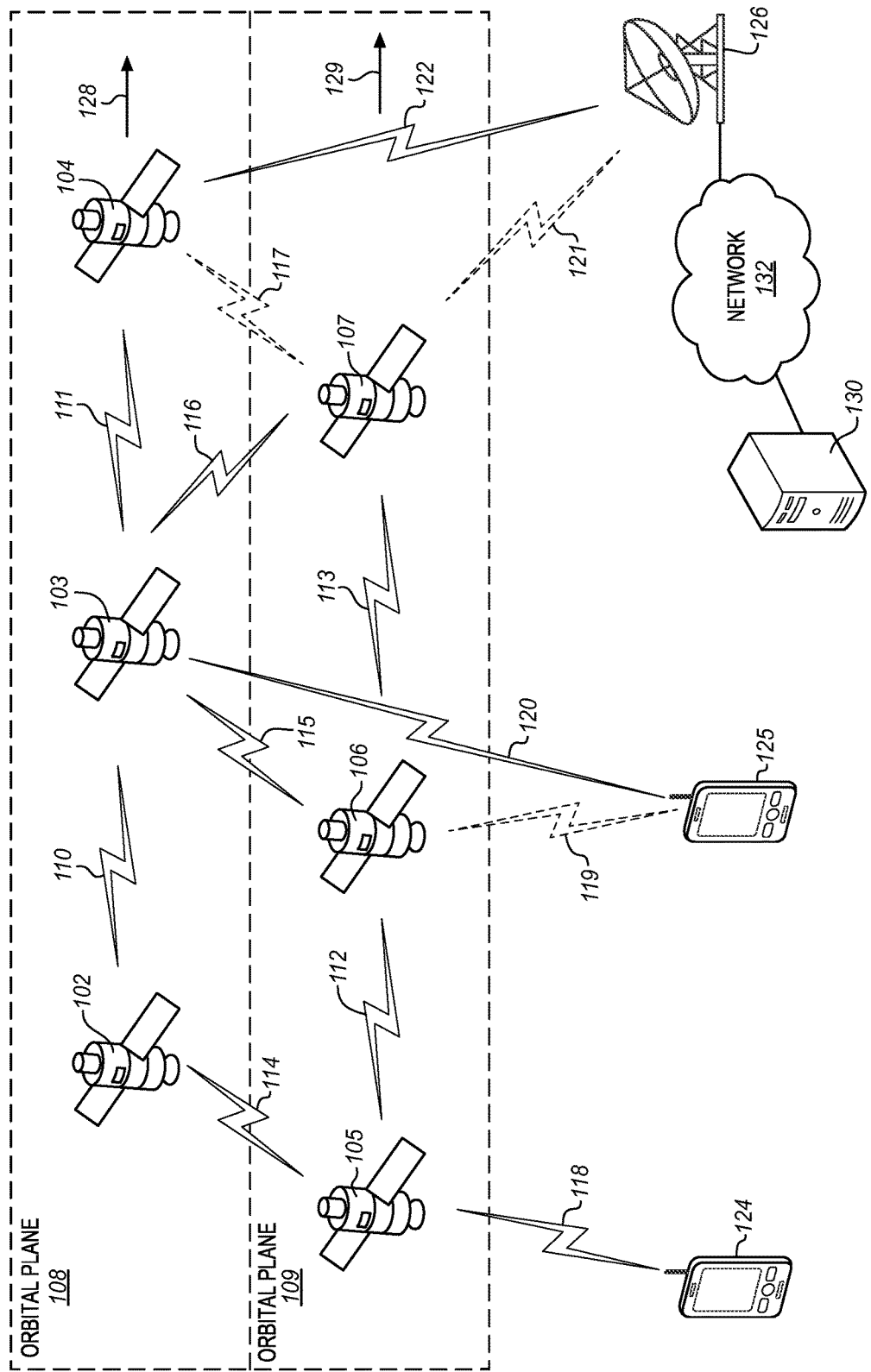
FIG. 1 depicts a NGSO satellite system topology in an illustrative embodiment.

As discussed previously, existing routing solutions for NGSO satellite systems rely heavily on real-time calculations and updates to on-board satellite Internet Protocol (IP) routers during handover events, which occur more frequently in NGSO satellite systems as compared to GEO satellite systems. FIG. 1 depicts a NGSO satellite system 100 in an illustrative embodiment. In this embodiment, system 100 includes a plurality of NGSO satellites 102-107 disposed within orbital planes 108-109. Orbital planes 108-109 comprise MEO orbital planes, LEO orbital planes, or combinations of MEO and LEO orbital planes in various embodiments. LEO satellites are typically found a circular orbit around the Earth between about 160 kilometers (km) to about 2,000 km above the Earth's surface, with an orbital period of about 90 minutes. MEO satellites are typically found in a circular orbit around the Earth between 2,000 km and less than GEO levels (e.g., 35,786 km), with orbital periods that vary from about 2 hours to nearly 24 hours.

While system 100 only depicts satellites 102-107 in LEO and MEO orbital planes, system 100 in other embodiments include satellites 102-107 in LEO and/or MEO in conjunction with other satellites (not shown) in GEO orbital planes. In system 100, satellites 102-104 reside in orbital plane 108, and satellites 105-107 reside in orbital plane 109.

In system 100, intra-orbit links 110-113 allow satellites 102-107 that reside in the same orbital planes 108-109 to communicate with each other. Generally, intra-orbit links 110-113 are fixed over time, as satellites 102-107 that reside in the same orbital planes 108-109 typically do not change position with respect to each other. Inter-orbit links 114-117 in system 100 allow satellites 102-107 that reside in different orbital planes 108-109 to communicate with each other. Inter-orbit links 114-117 change over time as satellites 102-107 that reside in different orbital planes 108-109 move with respect to each other. For example, if orbital plane 109 is closer to the surface of the Earth than orbital plane 108, then satellites 105-107 in orbital plane 109 may move in the direction of arrow 129 with respect to satellites 102-104 in orbital plane 108 (e.g., satellites 105-107 in orbital plane 109 sweep across the surface of the Earth in the direction of arrow 129 at a faster rate than satellites 102-104 in orbital plane 108, which move in the direction of arrow 128). As this movement occurs, a handoff may occur for satellite 107 as satellite 107 changes its communication link from satellite 103 to satellite 104. When a handoff occurs for satellite 107, an inter-orbit link 117 is created between satellite 107 and satellite 104, and an inter-orbit link 116 between satellite 107 and satellite 103 may be terminated (e.g., a make-before-break communication scenario that occurs as changes in the backbone routing topology information used by satellites 102-107 propagate through system 100).

Further in this embodiment, satellites 102-107 communicate with users 124-126 via user-links 118-122. In this embodiment, users 124-125 are depicted as mobile terminals (e.g., a mobile satellite phone) and user 126 is depicted as a ground station (e.g., a fixed placement installation). However, the number and types of users 124-126 may be different in other embodiments.

User-links 118-122 change over time as users 124-126 that are mobile (e.g., users 124-125) move across the surface of the Earth, and/or as satellites 102-107 move over time with respect users 124-126. For example, if satellites 102-107 in orbital planes 108-109 move in the direction of arrows 128-129 with respect to the surface of the Earth, user 125 may be handed off from satellite 103 in orbital plane 108 to satellite 106 in orbital plane 109. In this example, a new user-link 119 is created between user 125 and satellite 106, and an existing user-link 120 between user 125 and satellite 103 may be terminated. In another example, user 126 may be handed off from satellite 104 in orbital plane 108 to satellite 107 in orbital plane 109. In this example, a new user-link 121 is created between user 126 and satellite 107, and an existing user-link 122 between user 126 and satellite 104 may be terminated. Collectively, intra-orbit links 110-113, inter-orbit links 114-117, and user-links 118-122 may be referred to as communication links 110-122.

In prior NGSO architectures, a time-varying change in the NGSO topology generated real-time updates to the IP routing tables used by the NGSO satellites, with the topology changes triggering a ground controller to calculate new backbone routing information based on the orbital mechanics of the NGSO satellites, and to upload the backbone routing information to the NGSO satellites. These real-time updates generate significant computational overhead in an NGSO satellite system, and also generate significant data traffic between ground controllers in the NGSO satellite system and the satellites. Due to these activities, prior NGSO satellite systems do not scale well when the number of NGSO satellites increases. Further, when partial system outages occur and the real-time updates are no longer being distributed to the NGSO satellites, then a partial or a complete failure may occur in the system as the NGSO satellites move out of position with respect to each other and their inter-orbit and/or intra-orbit communication links are lost.

In the embodiments described herein, the time-varying changes to the backbone route tables in system 100 are pre-calculated in advance by a satellite controller 130 of system 100, transmitted to satellites 102-107, and are selected at different points in time by satellites 102-107 in order to allow satellites 102-107 to adapt to the time-varying changes in the backbone routes in system 100. In some of the embodiments described herein, time-varying changes to backbone route information in system 100 and the time-varying changes to user route information in system 100 are decoupled from each other using separate backbone route tables and user route tables onboard satellites 102-107. Satellite controller 130 may comprise a ground asset or an in-orbit asset in different embodiments. Satellite controller 130 may also be included within one or more of satellites 102-107 in other embodiments.

As the topology of system 100 changes over time, satellites 102-107 utilize different backbone route tables (e.g., as instructed by satellite controller 130 and/or based on a pre-defined schedule). As described in the previous example of inter-orbital link handoffs between satellites 102-107 due to the relative motion of satellites 102-107 in different orbital planes 108-109, inter-orbital link 117 between satellite 107 and satellite 104 may be created as satellite 104 comes into a field of view of satellite 107, and inter-orbital link 116 between satellite 107 and satellite 103 may be terminated as satellite 103 moves out of a field of view of satellite 107. In order to accommodate for this time-varying change in the backbone routes in system 100, satellites 103-104 and satellite 107 may select a different backbone route table than what was previously used, with the new backbone route table defining the new topology between satellites 103-104 and satellite 107. Thus, the use of pre-calculated backbone route tables in system 100 reduces or eliminates the typical router update traffic that occurs in prior NGSO satellite systems.

As the user route tables in system 100 change over time (e.g., as users 124-126 are handed off between different satellites 102-107 as previously described with respect to user 125), satellite controller 130 may update the user route tables of satellites 102-107 independently from the backbone route tables.

In addition to the functionality described above, system 100 further implements different data packet routing options through system 100 using different groups of backbone route tables that are selectable by satellites 102-107 during packet transport in order to implement various performance and/or security options for the data packets. Different routing options through system 100 may be implemented by using different subsets of the possible routing links in system 100 that are selected based on a desired transport performance, data transport cost, data transport reliability, and/or based on various security aspects. The routing options may include, but are not limited to, routes over system 100 that have a bandwidth higher or lower than a threshold bandwidth, routes over system 100 that have a packet delay higher or lower than a threshold packet delay, routes over system 100 that have a delivery reliability higher or lower than a threshold delivery reliability, routes over system 100 that have a transport cost higher or lower than a threshold transport cost, and/or routes over system 100 that include data packets matching the routing group and exclude other data packets not matching the routing group.

Determining whether data packets are routed with a particular routing group may depend upon various factors such as a particular user 124-126 associated with the data packet, a group of users 124-126 associated with the data packet, and/or a data type of the data packet. For example, system 100 may implement latency reduced routing for specific users 124-126, groups of users 124-126, and/or types of traffic, high or low data bandwidth routing for specific users 124-126, groups of users 124-126, and/or types of traffic, etc. This type of differential routing may be implemented based on the data transport and packet forwarding capabilities of satellites 102-107, which may be different from each other. For example, satellites 102-107, even if identical, may include both high-bandwidth and low-bandwidth communication link capabilities, both with each other over intra-orbit links 110-113 and/or inter-orbit links 114-117, and with users 124-126 locally connected to satellites 102-107 over user-links 118-122. In another example, satellites 102-107 may be different from each other with respect to their communication capabilities, with some of satellites 102-107 being placed in orbit later than others, with newer versions of satellites 102-107 having more advanced communication capabilities than the older versions of satellites 102-107. These types of communication capability differences between satellites 102-107 may include, but are not limited to, differential packet processing and forwarding capabilities, differential numbers and/or capabilities of communication links 110-122.

Figure 2:
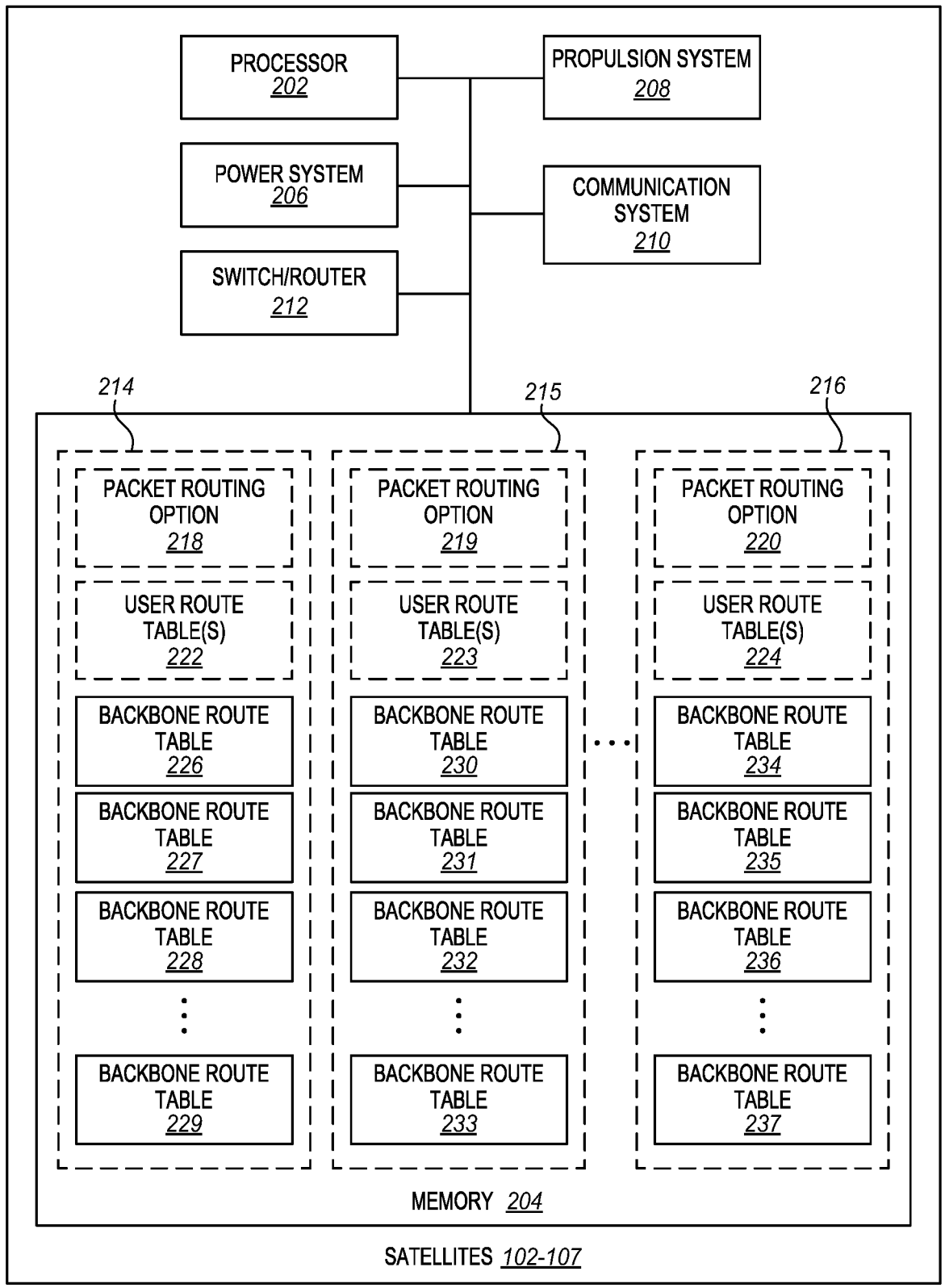
FIG. 2 is a block diagram of a satellite of the NGSO satellite system of FIG. 1 in an illustrative embodiment.

FIG. 2 is a block diagram of satellites 102-107 in an illustrative embodiment. In this embodiment, satellites 102-107 include, without limitation, one or more processors 202, a memory 204, a power system 206, a propulsion system 208, a communication system 210, and one or more switches/routers 212. Processor 202 (and any other processors described herein) includes any hardware device that is able to perform functions described for satellites 102-107, including executing programmed instructions that implement those functions. Processor 202 (and any other processors described herein) may include one or more Central Processing Units (CPU), microprocessors, Digital Signal Processors (DSPs), and/or Application-specific Integrated Circuits (ASICs), etc.

Memory 204 (and any other memory devices described herein) includes any hardware device that is able to store data. Memory 204 (and any other memory devices described herein) may include one or more volatile or non-volatile Dynamic Random-Access Memory (DRAM) devices, FLASH devices, volatile or non-volatile Static RAM devices, hard drives, and/or Solid-State Disks (SSDs), etc. Some examples of non-volatile DRAM and SRAM include battery-backed DRAM and battery-backed SRAM.

Power system 206 comprises any component, system, or device that stores and generates power for satellites 102-107. Some examples of power system 206 include batteries, solar panels, fuel cells, etc. Propulsion system 208 comprises any component, system, or device that provides in-orbit maneuvering capabilities to satellites 102-107. Propulsion system 208 may comprise onboard fuel, rocket motors, ion thrusters, etc. Communication system 210 comprise any component, system, or device that enables satellites 102-107 to communicate with each other and/or users 124-126 via communication links 110-122. Communication system 210 may comprise radio communication systems, optical communication systems, or combinations of radio and optical communication systems. Switch/router 212 comprises any component, system, or device that provides packet routing capabilities to satellites 102-107. This packet routing capability includes routing data packets received by satellites 102-107 to communication system 210 for data transmission over communication links 110-122.

In the embodiment depicted in FIG. 2, different routing strategies are implemented in system 100 using different routing groups 214-216, which are generated by satellite controller 130 based on their respective routing options 218-220. Routing groups 214-216 are utilized by satellites 102-107 to implement the different routing strategies and route traffic through system 100 between users 124-126. Each routing group 214-216 may be used to implement a different routing strategy for traffic, including implementing routing strategies that address latency, bandwidth, cost, and/or routing strategies that segregate different users 124-126, groups of users 124-126 and/or specific types of traffic to a subset of communication links 110-122 in system 100.

For example, packet routing option 218 for routing group 214 may define a reduced latency performance target for traffic routed through system 100 for users 124-126, groups of users 124-126 and/or type(s) of traffic, and satellite controller 130 may create backbone route tables 226-229 in routing group 214 to minimize the latency for this traffic as it is routed over intra-orbit links 110-113 and/or inter-orbit links 114-117. To do so, satellite controller 130 may estimate packet forwarding delays and/or link propagation delays for satellites 102-107 in system 100, utilize traffic engineering algorithms with the appropriate constraints across the various possible routing paths through system 100, analyze intra-orbit links 110-113 and/or inter-orbit links 114-117 for satellites 102-107, etc., in order to identify an optimized routing scenario that implements packet routing option 218. In some embodiments, routing group 214 includes one or more user route tables 222, which track the connectivity of users 124-126 to satellites 102-107. In these embodiments, satellite controller 130 may create, update, and maintain user route tables 222 to minimize the latency for this traffic, which is routed over user-links 118-122.

In another example, packet routing option 219 for routing group 215 may define a minimum bandwidth performance target for traffic routed through system 100 for users 124-126, groups of users 124-126 and/or type(s) of traffic, and satellite controller 130 may create backbone route tables 230-233 in routing group 215 to provide a minimum bandwidth performance target for this traffic as it is routed over intra-orbit links 110-113 and/or inter-orbit links 114-117. To do so, satellite controller 130 may analyze the communication bandwidth capabilities of satellites 102-107 in system 100, and analyze intra-orbit links 110-113 and/or inter-orbit links 114-117 for satellites 102-107 in order to identify an optimized routing scenario that implements packet routing option 219. In some embodiments, routing group 215 includes one or more user route tables 223. In these embodiments, satellite controller 130 may create, update, and maintain user route tables 223 to implement a minimum bandwidth performance target for this traffic as it is routed over user-links 118-122.

In another example, packet routing option 220 for routing group 216 may define a network segmentation for traffic routed through system 100 for users 124-126, groups of users 124-126 and/or type(s) of traffic in order to provide secure communications, and satellite controller 130 may create backbone route tables 234-237 in routing group 216 to isolate this traffic to specific intra-orbit links 110-113 and/or inter-orbit links 114-117 of system 100 with respect to other types of traffic. In some embodiments, routing group 216 includes one or more user route tables 224. In these embodiments, satellite controller 130 may create, update, and maintain user route tables 224 to isolate this traffic to specific user-links 118-122 of system 100 with respect to other types of traffic.

As previously mentioned, routing groups 214-216 in some embodiments may include user route tables 222-224 that track which satellites 102-107 users 124-126 are connected to. For example, if user 125 is connected to satellite 103 (e.g., via user-link 120), then user route tables 222-224 for satellite 103 may indicate that user 125 is locally connected to satellite 103 (e.g., via local routing information such as currently active user-link 120 and/or an egress port of switch/router 212 associated with user-link 120). User route tables 222-224 for satellite 102 and satellites 104-107 may indicate that user 125 is not attached to them locally. For instance, user route tables 222-224 for satellite 102, which is not locally connected to user 125, may indicate an egress port associated with forwarding data to user 125 (e.g., an egress port associated with intra-orbit link 110 between satellite 102 and satellite 103). As users 124-126 are handed off to different satellites 102-107 in system 100, satellite controller 130 may be tasked with generating new user route tables 222-224 for each of satellites 102-107 that indicate the connectivity changes for users 124-126, and transmitting the new user route tables 222-224 to satellites 102-107.

In addition, backbone route tables 226-237 may be different for each satellite 102-107, because each of satellites 102-107 may see a different portion of system 100 and/or because each of satellites 102-107 may have different communication capabilities. For example, if users 124-126 are communicating with each other via system 100 using routing group 214, it is clear from FIG. 1 that a number of possible routing paths exists across system 100 between users 124-126. Although intra-orbit link 112 exists between satellites 105-106, which would be a 1-hop forwarding scenario in system 100 between users 124-126, intra-orbit link 112 may not meet the performance, cost, and/or security criteria associated with packet routing option 218 of routing group 214, which would result in intra-orbit link 112 being omitted in the routing path between users 124-126 for backbone route tables 226-229.

Satellite controller 130 is therefore tasked with pre-calculating and uploading backbone route tables 226-239 for routing group 214 based on the subset of system 100 that a particular satellite 102-107 is operating within, as further segmented by the packet routing options 218-220 being implemented. Satellite controller 130 performs similar activities with respect to routing groups 215-216, modified by their respective packet routing options 219-220.

Satellite controller 130 may also be tasked with instructing satellites 102-107 which backbone route tables 226-229 for routing group 214, and/or which backbone route tables 230-233 for routing group 215, and/or which backbone route tables 234-237 for routing group 216 should be used at a particular point in time. For example, satellite controller 130 may instruct satellites 102-107 to utilize backbone route table 226 of routing group 214 when implementing a routing scenario for packet routing option 218 during a first time-frame of the day, and subsequently instruct satellites 102-107 to utilize backbone route table 227 of routing group 214 when implementing the routing scenario for packet routing option 218 during a second time-frame of the day that is different from the first time-frame.

Figure 3:
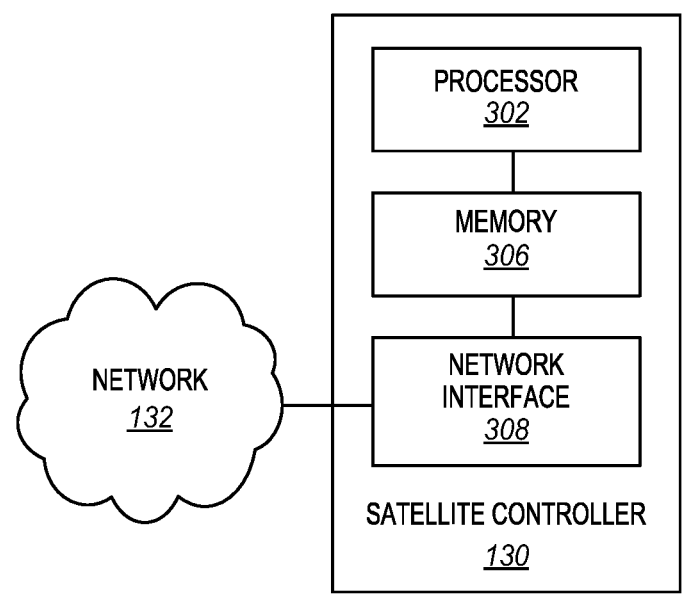
FIG. 3 is a block diagram of a satellite controller of the NGSO satellite system of FIG. 1 in an illustrative embodiment.

FIG. 3 is a block diagram of satellite controller 130 in an illustrative embodiment. In this embodiment, satellite controller 130 manages and communicates with satellites 102-107 over a network 132 that is coupled to user 126, which is illustrated as a ground station in this embodiment. In this embodiment, satellite controller 130 may include, without limitation, one or more processors 302 that execute software instructions, a memory 306, and a network interface 308. Network interface 308 electrically couples satellite controller 130 with network 132. Network interface 308 includes any component, system, or device that provides network signaling and network frame processing capabilities to satellite controller 130. Network 132 may comprise, in some embodiments, a local network, the Internet, or a combination of local networks and the Internet.

In some embodiments, satellite controller 130 comprises a Software-Defined Networking (SDN) architecture. In these embodiments, topology and traffic engineering intelligence and algorithms are instantiated as SDN applications executing on satellite controller 130. Satellite controller 130 manages satellites 102-107 using a-priori knowledge of movement of satellites 102-107 in orbital planes 108-109. In some embodiments, an SDN control plane is used to configure backbone route tables 226-237 and/or user route tables 222-224 for satellites 102-107. Satellite controller 130 is aware, a-priori when satellites 102-107 in different orbital planes 108-109 have overlapping fields of view with each other (e.g., when a field of view of satellite 103 overlaps with satellite 106). Satellite controller 130 also optimizes backbone routes for system 100, making decisions as to which inter-orbit links 114-117 to create and break (e.g., by creating inter-orbit link 117, and breaking inter-orbit link 116 as satellite 107 transitions out of the field of view of satellite 103 and transitions into the field of view of satellite 104).

In some embodiments, satellite controller 130 manages handover requests between users 124-126 and satellites 102-107. In one such embodiment, satellite controller 130 manages handover requests for users 124-126 using a mobility management SDN application executing on satellite controller 130, updating user route tables 222-224 onboard satellites 102-107 in real-time in response to user-link 118-122 handovers (e.g., updates to user route tables 222-224 are based on real-time connectivity changes between users 124-126 and satellites 102-107). In other embodiments, satellite controller 130 utilizes a-priori knowledge regarding predicted handoff events between users 124-126 and satellites 102-107 based on orbital mechanics to pre-calculate and upload user route tables 222-224 to satellites 102-107 in advance (e.g., user route tables 222-224 are based on the predicted connectivity changes between users 124-126 and satellites 102-107). Using pre-calculated user route tables 222-224, satellites 102-107 may operate autonomously for at least some period of time with respect to handovers between users 124-126 and satellites 102-107 if a temporary loss of communication occurs between satellites 102-107 and satellite controller 130.

Figure 4:
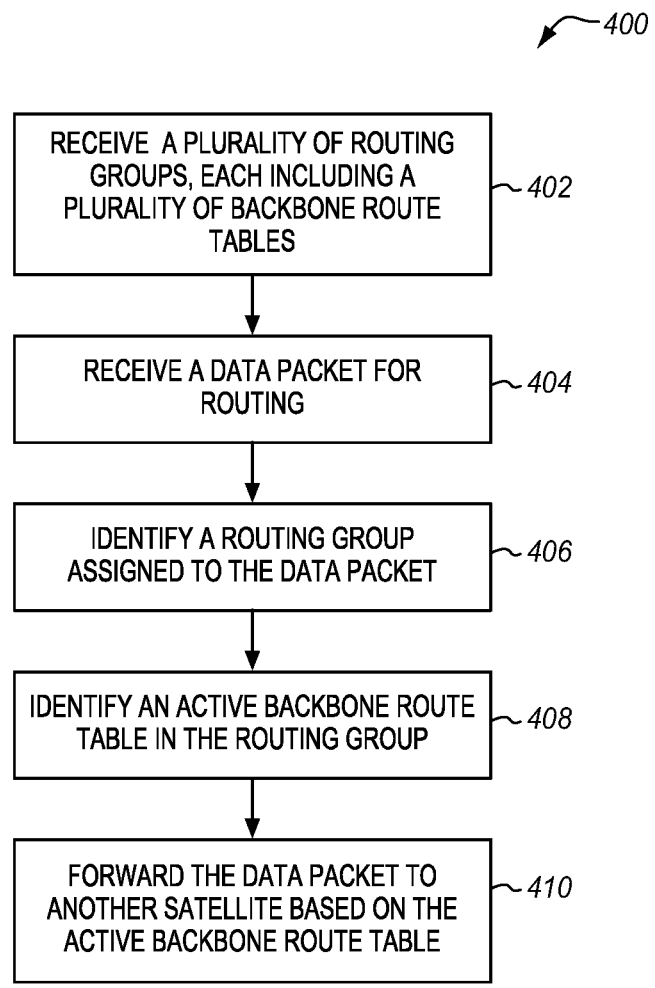
FIG. 4 is a flow chart of a method operable by a satellite of the NGSO satellite system of FIG. 1 in an illustrative embodiment.

FIG. 4 is a flow chart of a method 400 operable by a NGSO satellite in an illustrative embodiment, and FIGS. 5-9 depict additional details of method 400 in optional embodiments. Method 400 will be discussed with respect to satellite 103 of FIG. 1, although method 400 applies equally to satellite 102 and satellites 104-107 in system 100. In addition, method 400 applies equally to other NGSO satellites in other systems. The steps of method 400 are not all inclusive, and method 400 may include other steps, not shown. Further, the steps of method 400 may be performed in an alternate order.

Consider that system 100 is operational, and that satellite controller 130 has pre-calculated backbone route tables 226-237 for satellite 103. To do so, satellite controller 130 utilizes a-priori orbital information for satellite 103, including the time-varying field of view that satellite 103 has of satellite 102 and satellites 104-107 in system 100. For instance, over time, the field of view of satellite 103 to satellite 102 and satellites 104-107 may include satellite 105, satellite 106, and satellite 107, with satellite controller 130 pre-calculating backbone route tables 226-237 for satellite 103 that change over time accordingly. In addition, satellite controller 130 generates backbone route tables 226-237 based on packet routing options 218-220 in routing groups 214-216, which select a subset of the possible intra-orbit links 110-113 and/or inter-orbit links 114-117 maintained by satellite 103 in a time-varying manner based on link communication capabilities and/or security concerns. For instance, packet routing options 218-220 may include, without limitation, intra-orbit links 110-113 and/or inter-orbit links 114-117 maintained by satellite 103 having a bandwidth higher or lower than a threshold bandwidth, a packet delay higher or lower than a threshold packet delay, a delivery reliability higher or lower than a threshold delivery reliability, a transport cost higher or lower than a threshold transport cost, and/or intra-orbit links 110-113 and/or inter-orbit links 114-117 that are dedicated to specific traffic.

In response to pre-calculating backbone route tables 226-237, satellite controller 130 transmits routing groups 214-216 to satellite 103, which are received by satellite 103 and stored in memory 204 (see step 402 of FIG. 4).

Communication system 210 of satellite 103 may then receive a data packet for routing in system 100 (see step 404). For instance, satellite 103 may receive a data packet for user 124 over intra-orbit link 111 from satellite 104. As user 124 is locally connected to satellite 105 in the topology snapshot depicted in FIG. 1 via user-link 118, the data packet received by satellite 103 is forwarded towards satellite 105. Processor 202 of satellite 103 identifies which of routing groups 214-216 are assigned to the data packet (see step 406). To do so, processor 202 may analyze the data packet to identify metadata associated with the data packet, IP address information, prefix information, etc. In some embodiments, processor 202 identifies which of routing groups 214-216 are assigned to the data packet based on one or more of users 124-126 that the data packet originates from and/or is destined for, which groups of users 124-126 the data packet originates from and/or is destined for, the type of data packet (e.g., control plane data, user plane data, a protocol of the packet, etc., see step 702 of FIG. 7).

For purposes of discussion, assume that the data packet is tagged for high-bandwidth transport, and that this feature is provided by routing group 214 by optimizing back bone route tables 226-229 to favor links maintained by satellite 103 that provide a high-bandwidth optimized path from satellite 103 to satellite 105. Processor 202 of satellite 103 identifies an active backbone route table (e.g., backbone route table 226) in routing group 214, which is one snapshot of the time-varying topology changes of system 100 routable by satellite 103 (see step 408). Using active backbone route table 226, communication system 210 forwards the data packet to satellite 102 or satellites 104-107 (see step 410). For example, if the data packet is destined for user 124, then the data packet may eventually be forwarded to satellite 105, which is in communication with user 124 via user-link 118 maintained by satellite 105. For the topology snapshot depicted in FIG. 1, it is evident that a number of possible routes exist from satellite 103 to satellite 105, each of which may have different link capabilities that may or may not support high-bandwidth transport. Thus, active backbone route table 226 may define one of these routes to satellite 105, based not only on the specific communication capabilities of links maintained by satellite 103, but rather, of the total routing path between satellite 103 and satellite 105, which may include a plurality of links of varying communication capabilities. Although routing group 214 has been described with respect to optimizations of backbone route tables 226-229 for bandwidth between satellite 103 and satellite 105, packet routing option 218 may include other optimizations, previously described.

Figure 5:
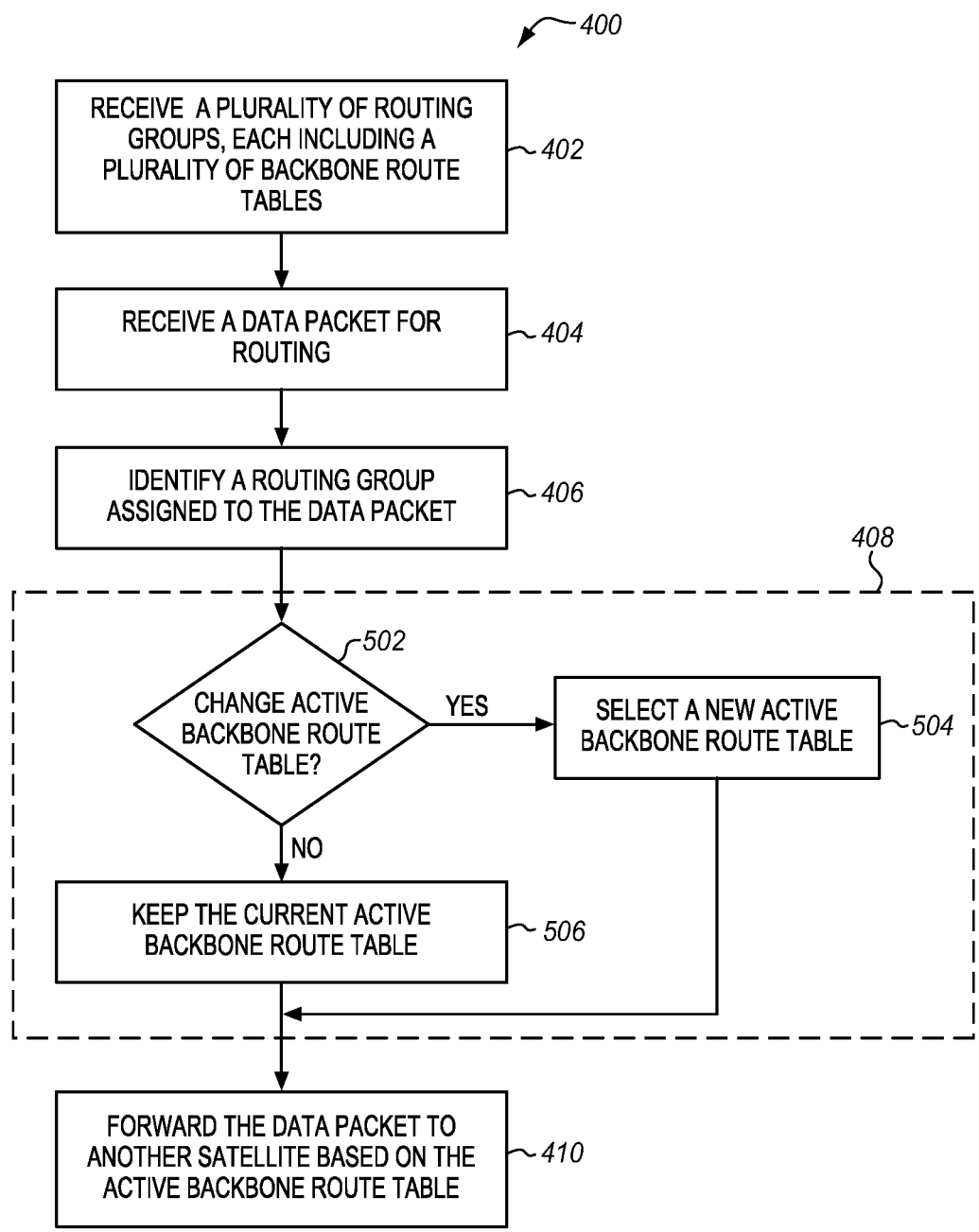
FIGS. 5-9 depict additional details of the method of FIG. 4 in illustrative embodiments.
Figure 6:
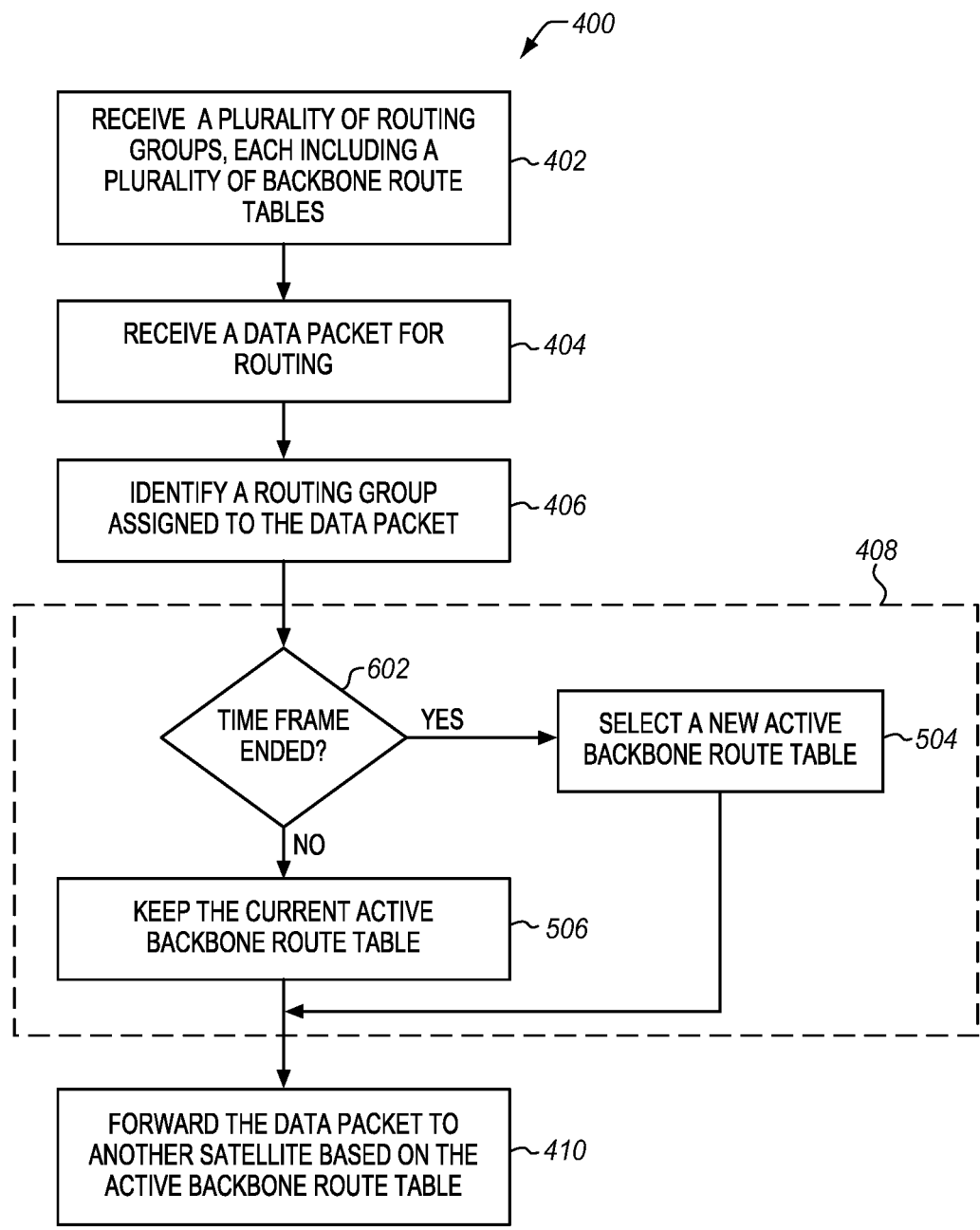
Figure 7:
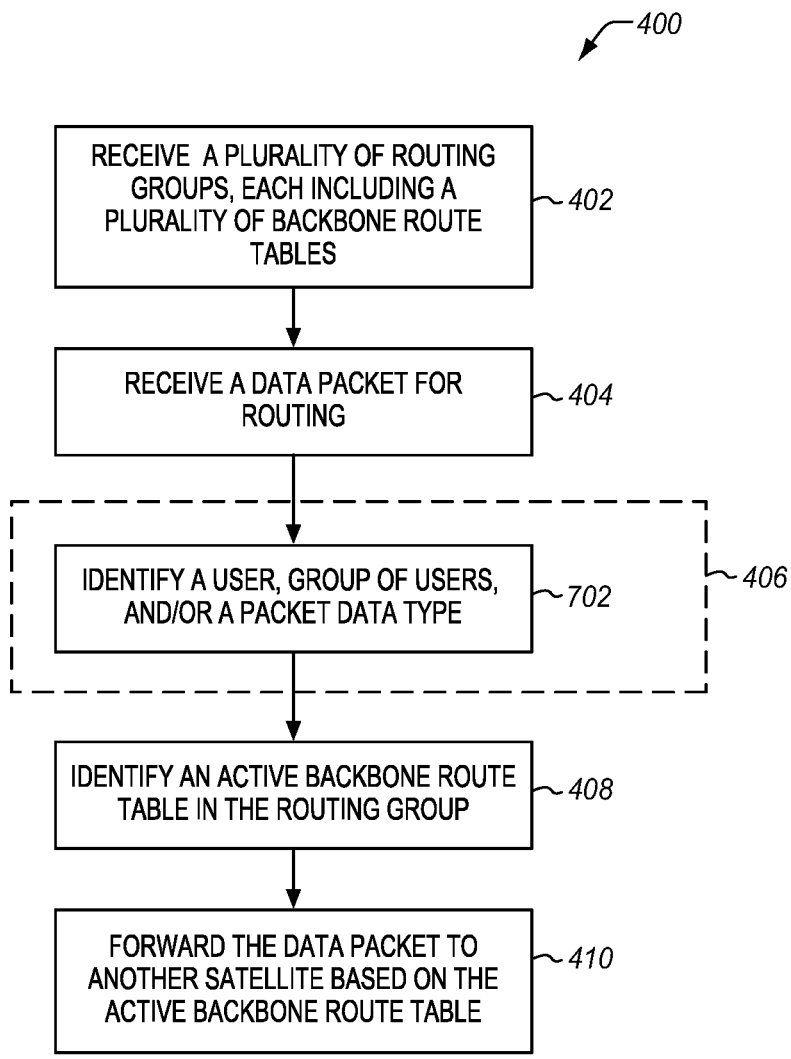
Figure 8:
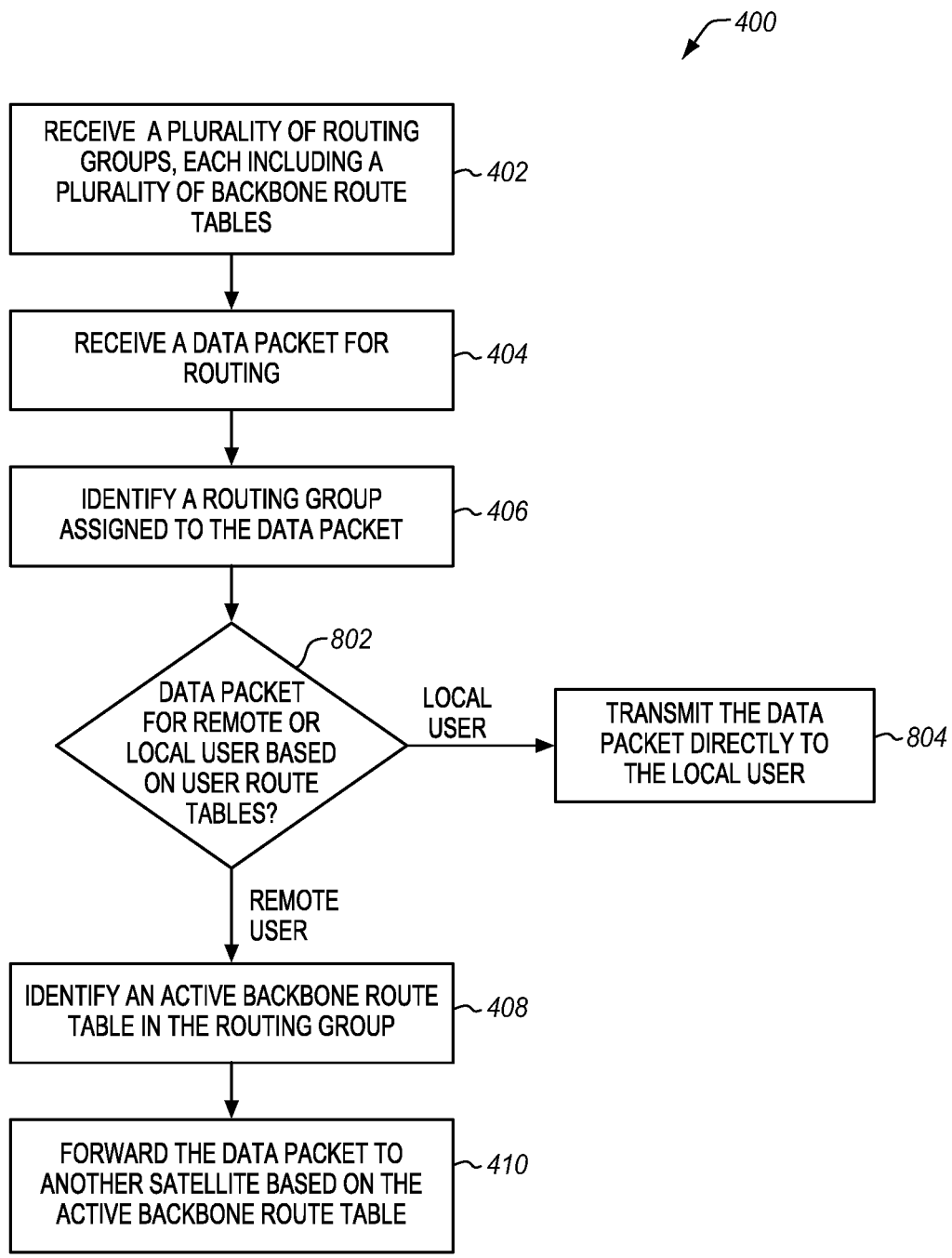
Figure 9:
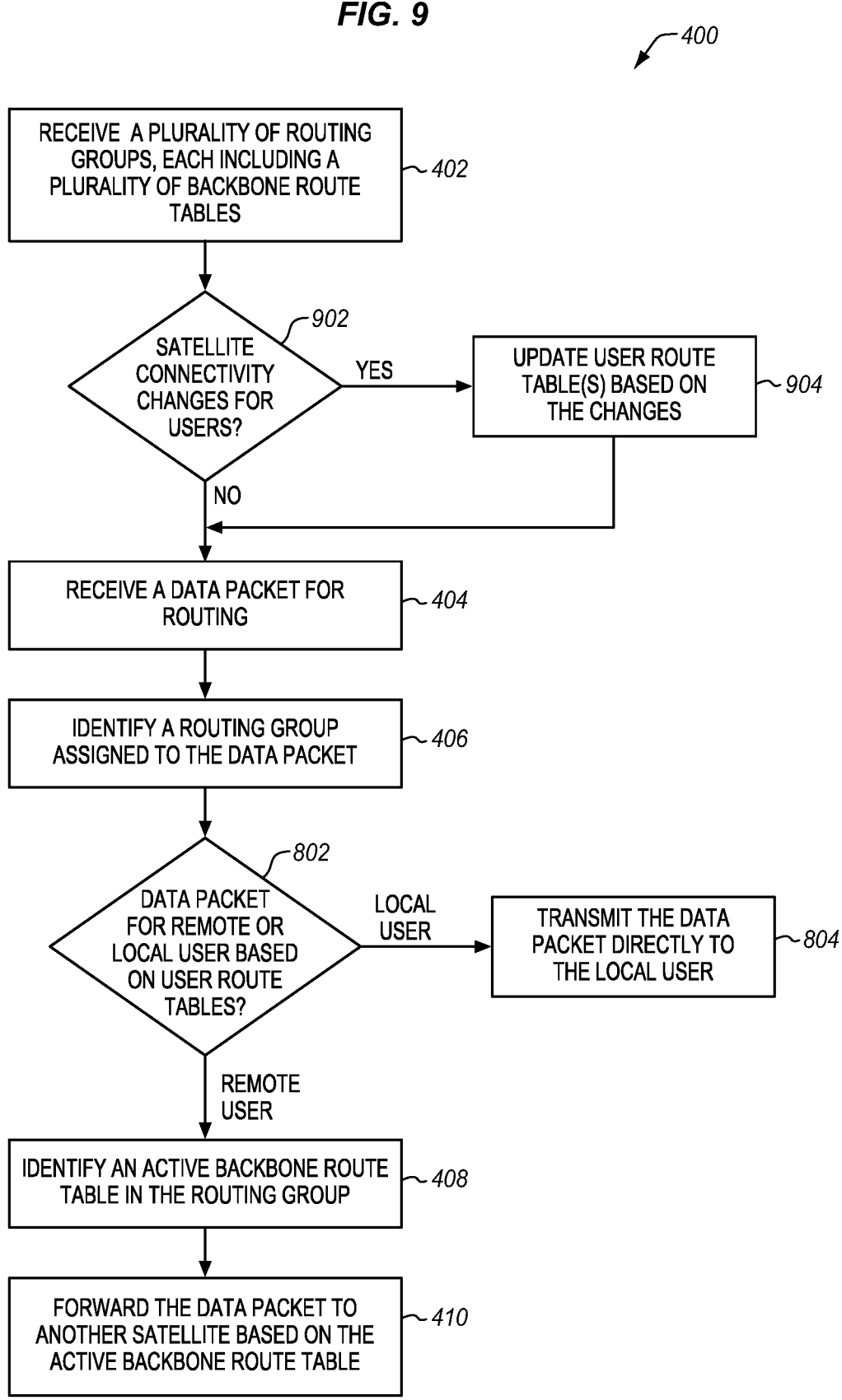

During operation, satellite 103 also determines if the active backbone route table in routing groups 214-216 have changed (see step 502 of FIG. 5). If the active backbone route table has not changed, then step 506 is performed. Generally, the active backbone route table is changed based on the time-varying topology changes in system 100. In one embodiment, satellite controller 130 instructs satellite 103 when to change the active backbone route table. In another embodiment, satellite 103 selects a different backbone route table based on an internal criteria, such as the time of day or a time frame (see step 602 of FIG. 6). If satellite 103 is instructed or decides to change which of backbone route tables 226-237 are active in their respective routing groups 214-216, then satellite 103 selects a new active backbone route table (see step 504). For instance, processor 202 may switch the active backbone route table from backbone route table 226 to backbone route table 227. A similar process is performed for routing groups 214-216.

Although the previous examples for satellite 103 were described with respect to user 124, which is locally connected to satellite 105 in FIG. 1, in some cases satellite 103 receives data packets that are destined for a local user, such as user 125. In FIG. 1, user 125 is locally connected to satellite 103 via user link 120. Satellite 103 may, therefore, upon receiving the data packet for routing in system 100, determine whether the data packet is destined for a local user (e.g., user 125) or a remote user (e.g., user 124 or user 126) using user route tables 222-224 in routing groups 214-216, respectively.

As discussed previously user route tables 222-224 may be used in some embodiments to indicate connectivity changes of users 124-126 to satellites 102-107. For example, satellite controller 130 may generate and upload user route tables 222-224 for satellite 103, which includes information regarding which of users 124-126 are locally connected to satellite 103 and which of users 124-126 are connected to satellite 102 or satellites 104-107 in system 100. For example, user route tables 222-224 for satellite 103 may indicate that user 125 is locally connected to satellite 103, and that user 124 and user 126 are connected to satellite 105 and satellite 104, respectively. This type of information allows satellite 103 to determine whether a data packet for users 125 is forwarded or handled locally. When satellite 103 receives a data packet, processor 202 of satellite 103 may therefore determine if the data packet is destined for a remote user or a local user (see step 802 of FIG. 9). In the previous example regarding data packets for user 124, which would be considered a remote user for satellite 103, processor 202 of satellite identifies the active backbone route table (see step 408) and forwards the data packet (see step 410) as previously described. If processor 202 determines that the data packet is for a local user (e.g., the data packet is destined for user 125, which is directly connected to satellite 103 via user link 120, then communication system 210 of satellite 103 transmits the data packet directly to user 125 via user link 120 without forwarding the data packet.

During operation, satellite 103 may also receive updates to user route tables 222-224 from satellite controller 130. For example, user route tables 222-224 may be updated as users 124-126 are handed off between satellites 102-107, with user route tables 222-224 generated by satellite controller 130 to not only reflect connectivity changes between users 124-126 and satellites 102-107, but also generated based on packet routing options 218-220 in order to optimize user route tables 222-224 to implement the various performance and/or security aspects of system 100. For instance, satellite 103 may have a number of different user link options for connecting to local users that vary based on the different performance criteria previously described, which may be used to optimize how user 124 is connected to satellite 103.

Figure 10:
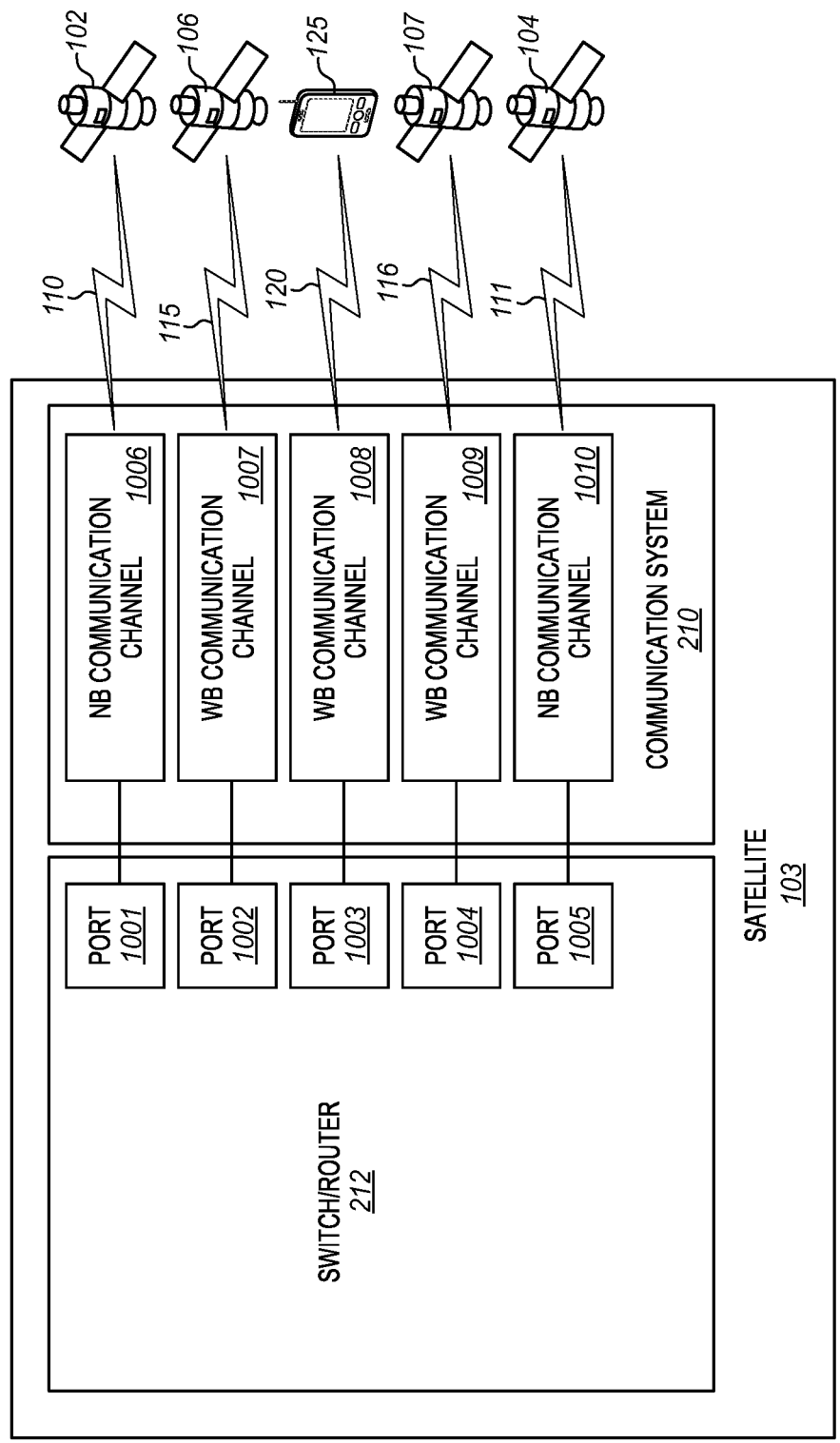
FIG. 10 is a routing implementation for a satellite of the NGSO satellite system of FIG. 1 in an illustrative embodiment.

FIG. 10 is a routing implementation for satellite 103 in an illustrative embodiment for the time-varying topology snapshot depicted in FIG. 1. In this embodiment, switch/router 212 for satellite 103 includes ports 1001-1005 which are communicatively coupled, respectively, to communication channels 1006-1010. Based on the topology of system 100 at a particular point in time, port 1001 provides a routing path to satellite 102 over a narrowband communication channel 1006 via intra-orbit link 110, port 1002 provides a routing path to satellite 106 over a wideband communication channel 1007 via inter-orbit link 115, port 1003 provides a routing path to user 125 over a wideband communication channel 1008 via user-link 120, port 1004 provides a routing path to satellite 107 over a wideband communication channel 1009 via inter-orbit link 116, and port 1005 provides a routing path to satellite 104 over a narrowband communication channel 1010 via intra-orbit link 111. FIG. 10 will be used in a subsequent discussion about how satellite 103 may perform a packet routing process using routing group 214, which in this example specifies that packet routing option 218 is for data packets classified for wideband transport.

FIG. 11 depicts user route tables 222 and backbone route table 226 (considered the active backbone route table in this example) for wideband classified traffic in an illustrative embodiment. In this example, FIG. 11 depicts routing group 214, which in this example has packet routing options 218 directed to implement wideband traffic routing. FIG. 11 illustrates a plurality of table numbers 1102 of 0-3, which are used by satellite 103 when processing data packets received for users 124-126. Further, each table number 1102 in FIG. 11 defines a match condition 1104 and an action 1106 that is taken when a match occurs in its corresponding table. Table zero corresponds to a user route table 222-1, which defines what action 1106 occurs when users 124-126 are not locally connected to satellite 103. Table one corresponds to a user route table 222-2, which defines what action 1106 occurs when users 1245-126 are locally connected to satellite 103. Table two defines which backbone route table is currently active, which is table 226 in routing group 214 in this example. Backbone route table 226 defines what action 1106 occurs when routing data packets to satellite 102 or satellites 104-107 (e.g., to user 124 and user 126, which are remote users).

When a data packet is received by satellite 103 and the data packet is classified as wideband packet data (e.g., the data packet is assigned to routing group 214), processing of the data packet begins at table zero of FIG. 11, which corresponds to user route table 222-1. In this embodiment, user route table 222-1 (table zero) identifies which of users 124-126 in system 100 are not locally connected to satellite 103. For example, user route table 222-1 defines that user 124 and user 126 are locally connected to satellites 105-106, respectively, and user route table 222-2 defines that user 125 is locally connected to satellite 103. When a wideband classified data packet is received by satellite 103 in this example, satellite 103 determines, based on the entries in table zero and match conditions 1104, whether the data packet is destined for user 124 or user 126. If a match occurs for an entry in table zero, then satellite 103 performs action 1106 in table zero that corresponds to the match entry. In particular, satellite 103 writes satellite node ID metadata for the data packet, which tags how the data packet is subsequently processed.

For example, if the wideband classified data packet received by satellite 103 is destined for user 124, then satellite 103 performs action 1106 to write a node ID of satellite 105 to metadata associated with the packet, and processing jumps to table two. If the wideband classified data packet received by satellite 103 is destined for user 126, then satellite 103 performs action 1106 to write the node ID of satellite 104 to metadata associated with the packet, and processing also jumps to table two. In either case, the metadata written for the data packet defines how backbone route tables 226 will forward the data packet through switch/router 212 (see FIG. 10) of satellite 103. Using table two in FIG. 11, satellite 103 identifies the active backbone route table 226. Using the information in table two, processing continues at table three in FIG. 11. Using table three and the metadata written for the data packet, satellite 103 identifies which of ports 1001-1005 of switch/router 212 the data packet is to be routed to. Satellite 103 then routes the data packet to one of satellite 102 or satellites 104-107 using the identified port at switch/router 212. Because the packet data in this example is classified for wideband packet transport over the topology of system 100, backbone route table 226 is optimized to utilize routes to user 124 and user 126 that support wideband communications. For example, as user 124 is local to satellite 105, satellite 103 can either forward the data packets for user 124 to either satellite 102 or satellite 106. However, because intra-orbital link 110 is narrowband (see FIG. 10), backbone route table 226 specifies that packet data for user 124 is to be forwarded to satellite 106 via inter-orbit link 115, which is a wideband communication path. Therefore, even though a number of routing options are possible for data packets forwarded to user 124, backbone route table 226 has been optimized to use a subset of the possible routing paths in order to implement the wideband communication classification for the data packet. A similar optimization in the routes that are used to forward data packets to user 126 is also present in backbone route table 226.

Returning to table zero, if no match condition 1104 is found for the data packet, then satellite 103 begins processing table one, which corresponds to user route table 222-2 for users 124-126 that are locally connected to satellite 103. In this case, no match in table zero assumes that the data packet received by satellite 103 is for users 124-126 that are locally connected to satellite 103.

As processing moves to table one based on action 1106 specified in table zero, satellite 103 determines if the data packet received by satellite 103 matches users 124-126. If no match occurs, then the packet is dropped. If the data packet does match one of users 124-126, then satellite 103 identifies a local port for its locally attached users 124-126. In this example, user 125 is locally connected to satellite 103 at port 1003 via user-link 120 (see FIG. 10). Therefore, satellite 103 performs action 1106 in table one to send the data packet over port 1003 at switch/router 212. In this example, one user-link 120 is available at satellite 103, which in this case is a wideband communication link. If satellite 103 had multiple downlink options available with varying capabilities, then table one would implement a subset of the possible user-links available to communicate with user 125, prioritizing wideband user-links over narrowband user-links.

The use of routing groups 214-216 that implement different packet routing options 218-220 enables system 100 to support various performance and/or security implementations for packet data routing in a time-varying topology present in system 100, thereby providing a technical benefit over the prior art.

Any of the various elements shown in the figures or described herein may be implemented as hardware, software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments were described herein, the scope is not limited to those specific embodiments. Rather, the scope is defined by the following claims and any equivalents thereof.

What is claimed is:

1. A method operable by a satellite of a Non-Geostationary Orbit (NGSO) satellite system, the method comprising:
receiving a plurality of routing groups that each define packet routing options for the satellite that are different, wherein each of the plurality of routing groups includes a plurality of backbone route tables comprising snapshots of a time-varying backbone topology of the NGSO satellite system that implement one of the packet routing options;
receiving a data packet for routing in the NGSO satellite system;
identifying a routing group of the plurality of routing groups assigned to the data packet;
identifying an active backbone route table from the plurality of backbone route tables in the routing group; and forwarding the data packet to another satellite in the NGSO satellite system utilizing at least one of an intra-orbit link and an inter-orbit link based on the active backbone route table to implement one of the packet routing options for the data packet.

2. The method of claim 1, wherein identifying the active backbone route table comprises:
determining that the active backbone route table in the routing group has changed; and
selecting a different backbone route table from the plurality of backbone route tables in the routing group to be the active backbone route table.

3. The method of claim 2, wherein determining that the active backbone route table has changed comprises:
determining that a time frame associated with the active backbone route table has ended.

4. The method of claim 1, wherein identifying the routing group assigned to the data packet comprises:
identifying at least one of a user associated with the data packet, a group of users associated with the data packet, and a data type of the data packet.

5. The method of claim 1, wherein:
each of the plurality of routing groups includes at least one user route table that identifies connectivity of users to satellites in the NGSO satellite system,
the method further comprises:
determining if the data packet is destined for at least one of a first user directly connected to the other satellite and a second user directly connected to the satellite based on the at least one user route table; and
transmitting the data packet to the second user over a user-link maintained by the satellite in response to determining that the data packet is destined for the second user.

6. The method of claim 5, further comprising:
determining if connectivity changes for at least one of the first user to the other satellite and second user to the satellite has occurred; and
updating the at least one user route table in the routing group in response to the connectivity changes.

7. The method of claim 5, wherein:
the packet routing options include at least two of:
communication links maintained by the satellite having a bandwidth higher or lower than a threshold bandwidth;
communication links maintained by the satellite having a packet delay higher or lower than a threshold packet delay;
communication links maintained by the satellite having a delivery reliability higher or lower than a threshold delivery reliability;
communication links maintained by the satellite having a transport cost higher or lower than a threshold transport cost; and
communication links maintained by the satellite that exclude other data packets not matching the routing group assigned to the data packet.

8. A Non-Geostationary Orbit (NGSO) satellite system, comprising:
a satellite, comprising:
a memory storing:
a plurality of routing groups that each define packet routing options for the satellite that are different, wherein each of the plurality of routing groups include a plurality of backbone route tables comprising snapshots of a time-varying backbone topology of the NGSO satellite system that implement one of the packet routing options; and
at least one processor configured to receive a data packet for routing in the NGSO satellite system, and to identify a routing group of the plurality of routing groups assigned to the data packet,
wherein the at least one processor is configured to identify an active backbone route table from the plurality of backbone route tables in the routing group, and to forward the data packet to another satellite in the NGSO satellite system over at least one of an intra-orbit link and an inter-orbit link based on the active backbone route table to implement one of the packet routing options for the data packet.

9. The NGSO satellite system of claim 8, wherein:
the at least one processor is configured to determine that the active backbone route table in the routing group has changed, and to select a different backbone route table from the plurality of backbone route tables in the routing group to be the active backbone route table.

10. The NGSO satellite system of claim 9, wherein:
the at least one processor is configured to determine that the active backbone route table has changed in response to determining that a time frame has ended.

11. The NGSO satellite system of claim 8, wherein:
the at least one processor is configured to identify the routing group for the data packet based on at least one of a user associated with the data packet, a group of users associated with the data packet, and a data type of the data packet.

12. The NGSO satellite system of claim 8, wherein:
each of the routing groups includes at least one user route table that identifies connectivity of users to satellites in the NGSO satellite system,
the at least one processor is configured to determine if the data packet is destined for at least one of a first user directly connected to the other satellite and a second user directly connected to the satellite based on the at least one user route table, and to transmit the data packet to the second user over a user-link maintained by the satellite in response to determining that the data packet is destined for the second user.

13. The NGSO satellite system of claim 12, wherein:
the at least one processor is configured to update the at least one user route table in the routing group in response to at least one of connectivity changes of the first user to the other satellite and connectivity changes of the second user to the satellite.

14. The NGSO satellite system of claim 12, wherein:
the packet routing options include at least two of:
communication links maintained by the satellite having a bandwidth higher or lower than a threshold bandwidth;
communication links maintained by the satellite having a packet delay higher or lower than a threshold packet delay;
communication links maintained by the satellite having a delivery reliability higher or lower than a threshold delivery reliability;
communication links maintained by the satellite having a transport cost higher or lower than a threshold transport cost; and
communication links maintained by the satellite that exclude other data packets not matching the routing group assigned to the data packet.

15. A Non-Geostationary Orbit (NGSO) satellite system, comprising:
a satellite, comprising:
a memory storing:
a plurality of routing groups that each define different packet routing options for the satellite, wherein each of the routing groups includes at least one backbone route table that implements one of the different packet routing options using a snapshot of a time-varying backbone topology of the NGSO satellite system routable by the satellite; and
at least one processor configured to receive a plurality of data packets for users directly connected to other satellites of the NGSO satellite system, to identify the routing groups assigned to the data packets, and to differentially route the data packets to the other satellites using the at least one backbone route table in different routing groups.

16. The NGSO satellite system of claim 15, wherein:
the at least one backbone route table comprises a plurality of backbone route tables, each associated with a different snapshot of the time-varying backbone topology of the NGSO satellite system, with one of the backbone route tables being an active backbone route table that implements one of the different packet routing options,
the at least one processor is configured to determine that the active backbone route table in the routing group has changed, and to select a different backbone route table from the plurality of backbone route tables in the routing group to be the active backbone route table.

17. The NGSO satellite system of claim 16, wherein:
the at least one processor is configured to determine that the active backbone route table has changed in response to determining that a time frame assigned to the active backbone route table has ended.

18. The NGSO satellite system of claim 15, wherein:
the at least one processor is configured to identify the routing group for the data packet based on at least one of a user associated with the data packet, a group of users associated with the data packet, and a data type of the data packet.

19. The NGSO satellite system of claim 15, wherein:
each of the routing groups includes at least one user route table that identifies connectivity of users to satellites in the NGSO satellite system,
the at least one processor is configured to determine if the data packet is destined for at least one of a first user directly connected to the other satellite and a second user directly connected to the satellite based on the at least one user route table, and to transmit the data packet to the second user in response to determining that the data packet is destined for the second user.

20. The NGSO satellite system of claim 19, wherein:
the at least one processor is configured to update the at least one user route table in the routing group in response to at least one of connectivity changes of the first user to the other satellite and connectivity changes of the second user to the satellite.

* * * * *